United States Patent [19]
Knight et al.

[11] Patent Number: 5,570,096
[45] Date of Patent: Oct. 29, 1996

[54] METHOD AND SYSTEM FOR TRACKING SATELLITES TO LOCATE UNKNOWN TRANSMITTING ACCURATELY

[75] Inventors: Curtis A. Knight, Washington, D.C.; John C. Webber, Herndon, Va.

[73] Assignee: Interferometrics, Inc.

[21] Appl. No.: 410,279

[22] Filed: Mar. 24, 1995

[51] Int. Cl.[6] ................................................ G01S 5/02
[52] U.S. Cl. ...................... 342/357; 342/352; 342/418; 342/461
[58] Field of Search .................... 342/359, 352, 342/357, 418, 461, 450, 417

[56] References Cited

U.S. PATENT DOCUMENTS

| | | | |
|---|---|---|---|
| 4,990,924 | 2/1991 | McMullen et al. | 342/359 |
| 5,043,737 | 8/1991 | Dell-Imagine | 342/358 |
| 5,241,319 | 8/1993 | Shimizu | 342/358 |
| 5,274,382 | 12/1993 | Wills et al. | 342/359 |

*Primary Examiner*—Thomas H. Tarcza
*Assistant Examiner*—Dao L. Phan
*Attorney, Agent, or Firm*—Finnegan, Henderson, Farabow, Garrett & Dunner, L.L.P.

[57] ABSTRACT

A satellite tracking system, including a terrestrial transmitter, a plurality of terrestrial receivers, and a controller/analyzer, operates in two modes. In an active mode, the transmitter emits a tracking signal within a spread spectrum to a satellite and at least one of the receivers receives the signal retransmitted by the satellite. The controller/analyzer then determines the satellite position and velocity from the received signal. In a passive mode, at least two receivers each receive a signal transmitted from the satellite during normal operation and the controller/analyzer determines the satellite position and velocity from the received signals. The satellite position and velocity can be used to determine the position of an unknown transmitter that causes interference at the satellite.

22 Claims, 5 Drawing Sheets

METHOD AND SYSTEM FOR TRACKING SATELLITES TO LOCATE UNKNOWN TRANSMITTING ACCURATELY

BACKGROUND OF THE INVENTION

1. Field of Invention

The invention relates to a method and system for tracking satellites. More particularly, the invention relates to a method and system for tracking satellites so that unknown transmitters can be accurately located.

2. Description of Related Art

Various techniques have been proposed for locating an unknown transmitter that causes interference at a satellite receiver. One such technique is described in U.S. Pat. No. 5,008,679, entitled "Method and System for Locating an Unknown Transmitter" and issued to Effland et al. on Apr. 16, 1991, the contents of which are hereby incorporated by reference.

As described in the '679 patent, interfering signals from an unknown transmitter are received by two remote receivers (e.g., a satellite experiencing interference and an adjacent satellite) at known positions and traveling with known velocities. The remote receivers (e.g., the satellites) then retransmit the interfering signals to two ground receivers. These satellites may be equipped with a "bent pipe" transponder, which receives and retransmits a signal with no processing other than filtering, amplifying, and possibly shifting the RF frequency. Using the retransmitted signals received at the ground receivers, a processor calculates the differences in time and frequency of arrival of the signals from the two remote receivers, referred to as "TDOA" and "FDOA," respectively, to determine the location of the unknown transmitter.

To achieve a reasonable degree of accuracy using this technique, it is important that the position and velocity of each of the remote receivers (e.g., the satellites) are known. Slight inaccuracies in the position or velocity of the satellites can result in significant error in relating the measurements of TDOA and FDOA to a position on the ground.

Usually, these satellites are placed in geostationary orbits; that is, their orbits are chosen so they have a nearly constant apparent position relative to a user on Earth. To counteract forces from, for example, the gravity of the sun and moon, a satellite has thrusters used to alter its velocity and maintain it in geostationary orbit within a desired distance, typically ±0.025 degrees as viewed from Earth, of its assigned position. Proper orbital correction, however, requires that the satellite orbit prior to correction be known. Thus, it is desirable to determine accurately the orbit of the satellite in order to maintain geostationary orbit.

Satellite orbits are typically defined by six numbers that specify a path traced out by the orbiting satellite and the position of the satellite along that path at a particular time, referred to as the "epoch time." These six numbers may be represented by three Cartesian coordinates specifying the satellite's position and three Cartesian velocity components specifying the satellite's velocity at the epoch time. Alternatively, these numbers may be represented in accordance with other conventional techniques, such as the "classical orbital elements."

One prior art technique of determining the positions and velocities of satellites uses tone ranging to measure the distance from a ranging station to the satellite. Typically, a ranging station transmits two or more unmodulated (CW) signals to a satellite, which retransmits the signals back to the station. The difference in roundtrip phase delay among the signals is used to determine the satellite's distance from the ranging station at a particular time. Repeated distance measurements from one or more ranging stations are analyzed to determine satellite orbits.

For example, if a satellite is at a distance d from a ranging station, the roundtrip phase shift of a signal transmitted from the station at frequency $\omega$ will be:

$$\phi = \frac{\omega d}{c} + \phi_{sat} + \frac{(\omega + \Omega)d}{c} \quad (1)$$

where d is the distance from station to satellite, $\phi_{sat}$ is a phase shift introduced by the satellite's frequency translation equipment, $\Omega$ is the transponder design frequency translation, and c is the speed of light. Small effects influenced by, for example, the propagation medium and the relative motion of station and satellite are omitted for simplicity.

From this relation, it is simple to obtain the derivative of equation (1) as follows:

$$\frac{\partial \phi}{\partial \omega} = \frac{2d}{c} \quad (2)$$

The derivative $\partial \phi / \partial \omega$ can be estimated, for example, by measuring $\phi$ at two frequencies and dividing by the difference in frequency. Using this estimate, the distance d can be calculated from equation (2).

In practice, it is desirable to measure the phase at a plurality of frequencies with different frequency separations to permit d to be determined unambiguously even though the phase can only be determined modulo $2\pi$. Yet, it is also desirable to use the tone ranging technique without interfering with the normal use of the satellite. Because of these desires, however, the tone ranging activity is restricted to a relatively narrow total bandwidth, reducing the potential accuracy of an individual measurement. The accuracy of orbit determination is directly related to the accuracy of the individual ranging measurements. Thus, it is desirable to determine more accurately the position and velocity of a satellite without interfering with its normal use, in order to determine the orbital parameter more accurately.

Moreover, prior art satellite tracking techniques require the attention of many persons for their operation and often produce data that are ambiguous as a result of imprecision in the measurement of the phase for a particular tone. Thus, it is also desirable to track satellite orbits accurately with minimal effort.

In addition, prior art systems require a multiplicity of measurements of d (or equivalently the time delay d/c) to be measured at different times and from different ranging stations in order to determine the orbital parameters. Usually, a number of measurements are obtained and processed to determine a satellite orbit and predict the time of a satellite maneuver. Another set of measurements is obtained and processed after the satellite maneuver to determine the new satellite orbit. This procedure must be repeated after each satellite maneuver, which may be anywhere from 4 to 24 days from the previous satellite maneuver. Performing an orbital maneuver based on an inaccurate orbit results in an inaccurate orbital correction, which may waste fuel and reduce the satellite's usable life. Thus, it is desirable to track satellite orbits continuously in order to maintain accurate determinations of the satellites' positions and velocities.

SUMMARY OF THE INVENTION

The principal advantage of the invention is the provision of a method and system that substantially obviates one or more of the limitations and disadvantages of the described prior methods and systems.

Another advantage of the invention is accurate determination of satellite orbits.

A further advantage is automatic determination of satellite orbits, thus reducing staffing requirements.

Yet a further advantage is performing tracking measurements without interfering with normal use of the satellite for relaying signals.

Yet another advantage is continuous determination of satellite orbits, thus avoiding uncertainties involved in predicting the future position of a satellite based on an imperfect orbit determination and force model.

Still another advantage is accurate orbit determination, which can be used to determine accurately the location of an unknown transmitter.

Additional features and advantages of the invention will be set forth in the description that follows and in part will be apparent from the description or may be learned by practice of the invention. The objectives and other advantages of the invention will be realized and attained by the method and system particularly pointed out in the written description and claims hereof as well as the appended drawings.

To achieve these and other advantages and in accordance with the purpose of the invention, as embodied and broadly described, the invention includes, in a satellite tracking system, a method of tracking a satellite, comprising the steps of transmitting a tracking signal from a transmitter having a known location to the satellite; receiving and retransmitting the tracking signal at the satellite; receiving the retransmitted tracking signal at at least one receiver having a known location; determining time delay and Doppler shift of the tracking signal received at the at least one receiver; and determining at least one of a position and velocity of the satellite based upon the determined time delay and Doppler shift. In addition, the invention includes the step of determining a position of an unknown transmitter in accordance with the determined position of the satellite.

In another aspect, the invention includes, in a satellite tracking system, a method of tracking a satellite comprising the steps of receiving at a plurality of receivers having known locations a signal from the satellite; transmitting the received signals to a central location; determining a difference in time delay and Doppler shift of the received signals at the central location; and determining at least one of a position and velocity of the satellite based upon the determined difference in time delay and Doppler shift. In addition, the invention includes the step of determining a position of an unknown transmitter in accordance with the determined position of the satellite.

In a further aspect, the invention includes a satellite tracking system operable in two modes for tracking a satellite, comprising means for transmitting a tracking signal to the satellite, the transmitting means having a known location; first means for receiving a signal, including the tracking signal retransmitted from the satellite, the first receiving means having a known location; second means for receiving a signal, including the tracking signal retransmitted from the satellite, the second receiving means having a known location; means for controlling the transmitting means, first receiving means, and second receiving means; and means for determining at least one of a position and velocity of the satellite based upon at least one of the received retransmitted tracking signals. In addition, the system includes means for providing the determined satellite position to a system for locating an unknown transmitter.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION

Figure 1:
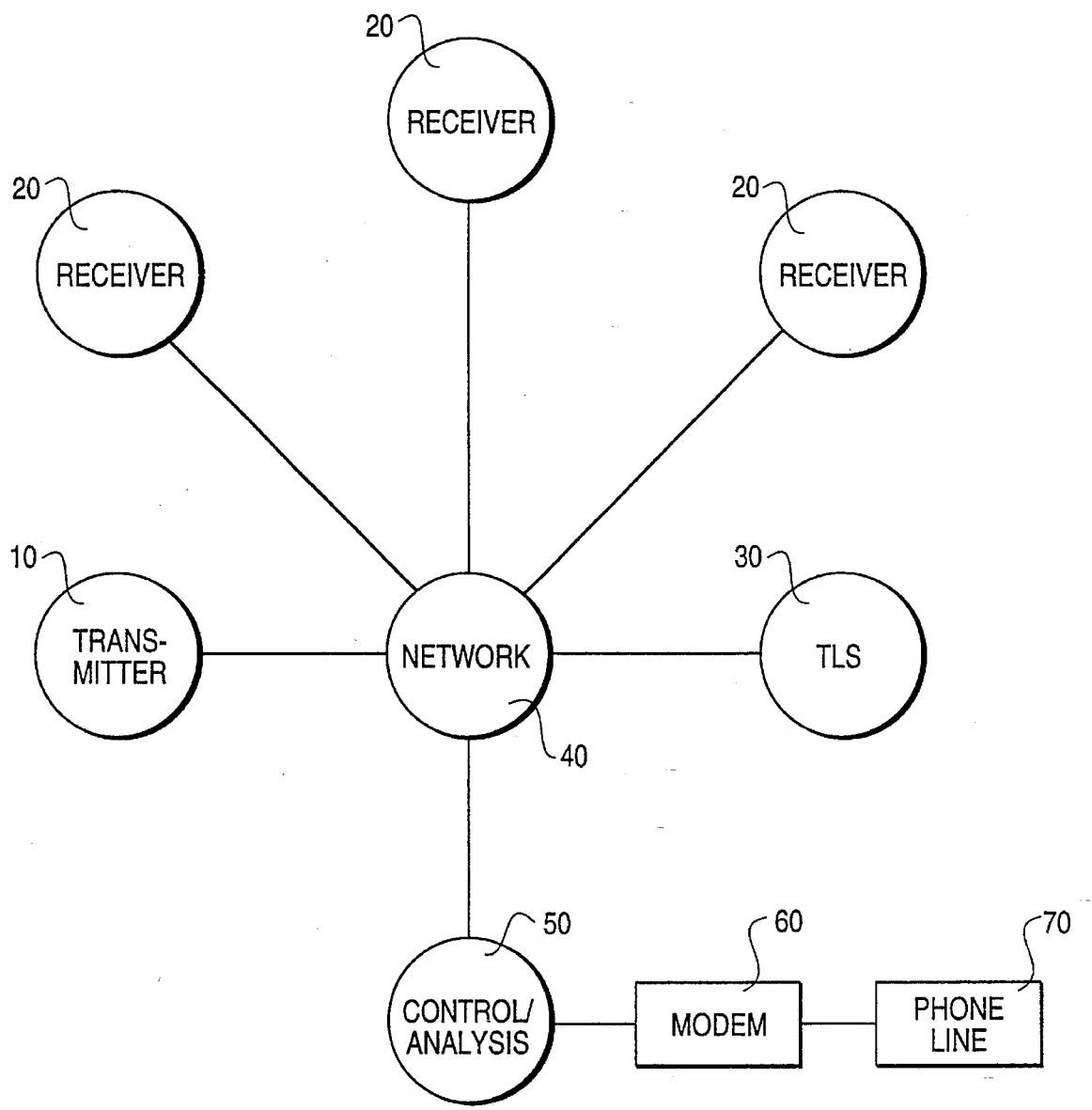
FIG. 1 is a block diagram illustrating a satellite tracking system in accordance with a preferred embodiment of the invention.

In accordance with the invention, a system receives and analyzes signals transmitted from a satellite to obtain measurements used to determine the position and velocity of the satellite.

Reference will now be made in detail to the present preferred embodiment of the invention, which is illustrated in the accompanying drawings in which like reference characters refer to corresponding elements.

As shown in FIG. 1, the satellite tracking system of the invention preferably includes a transmitter 10, a plurality of receivers 20, a Transmitter Location System ("TLS") 30, a wide-area network 40, a controller/analyzer 50, a modem 60, and a phone line 70. Transmitter 10, plurality of receivers 20, TLS 30, and controller/analyzer 50 are connected to network 40. Controller/analyzer 50 is connected to phone line 70 via modem 60.

In tracking a satellite, the system preferably can operate in one of two modes: an active mode and a passive mode. In the active mode, transmitter 10 emits a tracking signal, which is preferably synchronized with Universal Time. The satellite being tracked receives and retransmits the tracking signal. Receivers 20 receive the retransmitted tracking signal, convert the received signals to digital form, and transmit the received signals to controller/analyzer 50 via network 40. Controller/analyzer 50 processes the signals to determine the position and velocity of the satellite.

In the passive mode, at least two receivers 20 receive signals transmitted from the satellite being tracked, preferably signals transmitted during normal operation of the satellite. Receivers 20 transmit the received signals to controller/analyzer 50 via network 40. Controller/analyzer 50 processes the signals to determine the position and velocity of the satellite.

In the active mode, transmitter 10 and receivers 20 are located at known locations on Earth and are preferably synchronized to Universal Time. In the passive mode, the location of transmitter 10 need not be known. Transmitter 10 and receivers 20 are described in greater detail below with reference to FIGS. 2 and 3, respectively.

In a preferred embodiment, receivers 20 are geographically located such that one pair of receivers is separated widely in latitude, and another pair is separated widely in longitude. In such an arrangement, receivers 20 provide measurements sufficient to determine the three coordinates of the satellite position independent of an orbital model. If an orbital model is known, the information provided by each measurement will permit rapid determination of the orbit.

Although FIG. 1 shows three receivers 20, alternative embodiments of the system can employ fewer receivers. For example, in the active mode, the system can operate with a single transmitter and a single receiver, although this reduces the effectiveness of the system due to the limits of having range measurements along only one line of sight. In passive mode, the system does not use a dedicated transmitter 10, but uses a signal transmitted by any convenient transmitter using the satellite, and can operate with two receivers 20. However, in this arrangement, the system is less accurate since only a single range difference measurement is obtained.

Transmitter 10 and receivers 20 are controlled by controller/analyzer 50, which preferably comprises software running on a conventional computer, programmed to carry out the functions described herein. Controller/analyzer 50 sends commands to and receives data from transmitter 10 and receivers 20 through network 40.

TLS 30 represents the system for locating an unknown transmitter described in the '679 patent. As shown in FIG. 1, TLS 30 is connected to network 40, thereby providing direct access to the results of the satellite orbit determination. Alternatively, other systems (not shown) could also be connected to network 40 to obtain direct access to satellite orbit information.

Also, other systems (not shown) can access the satellite orbit information from the system shown in FIG. 1 through phone line 70 via modem 60. However, since modem 60 is connected to controller/analyzer 50, rather than directly to network 40, this access can be secured to limit access to the information.

Figure 2:
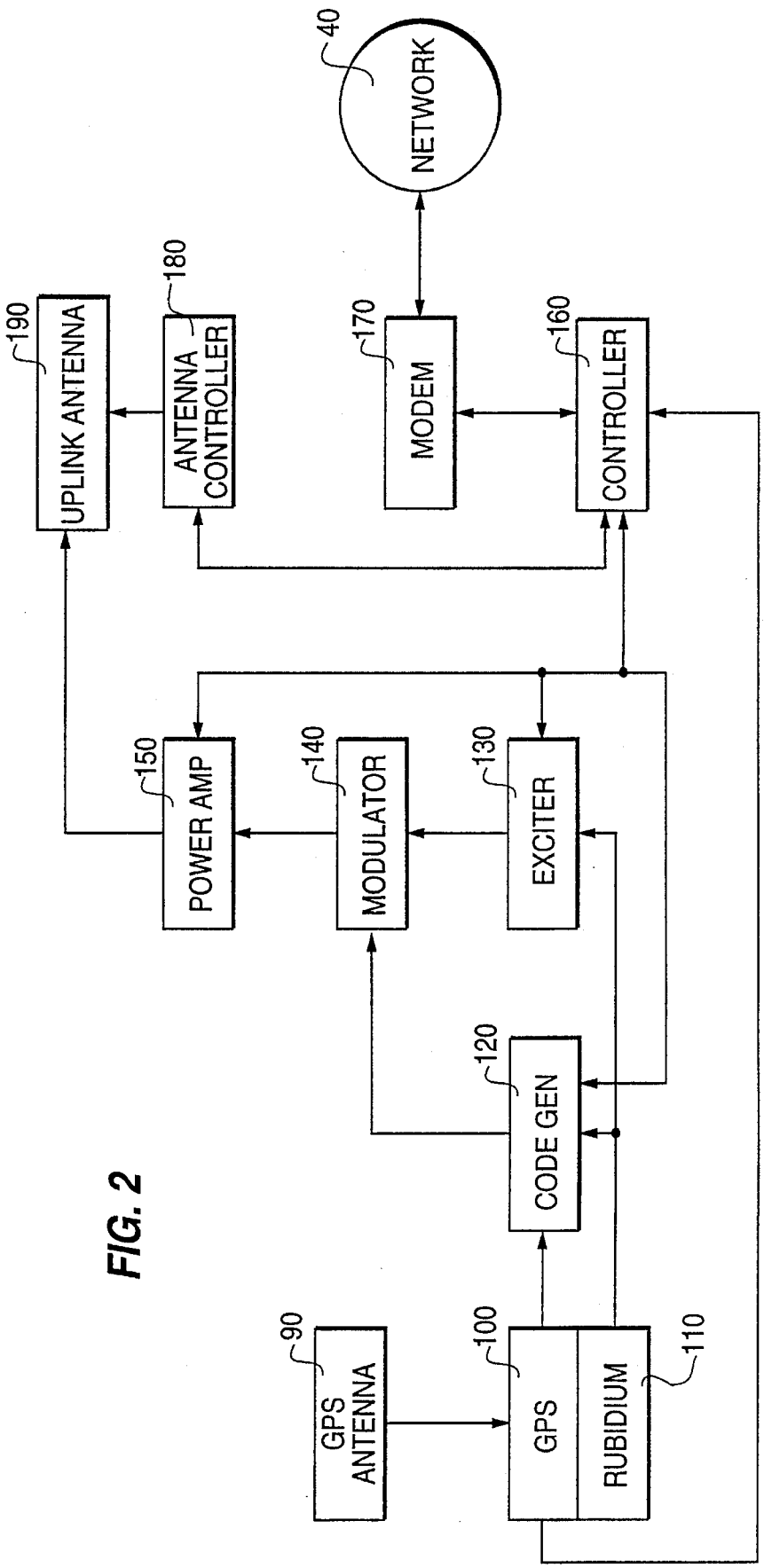
FIG. 2 is a block diagram illustrating a transmitter used in the system shown in FIG. 1, in accordance with a preferred embodiment of the invention.

As shown in FIG. 2, transmitter 10 includes a GPS antenna 90, a GPS timing receiver 100, and a stable oscillator 110, shown as a rubidium-cell stabilized oscillator. Oscillator 110 is preferably controlled by GPS receiver 100.

Antenna 90, receiver 100, and oscillator 110 form a stable time and frequency generation system, which is used to control the epoch of code generator 120 and the frequency of exciter 130. GPS receiver 100 provides differential corrections to controller 160 to be distributed to the receiver stations via modem 170 and network 40.

Code generator 120 generates a pseudorandom code made up of a sequence of data bits at a variable rate as commanded by controller 160 and is preferably synchronized to Universal Time. The sequence of data bits is most appropriately a maximal length sequence or some other sequence with a desired autocorrelation property. The bit rate is determined by the amount of spreading bandwidth desired. In some cases, for example, when observing a satellite for the first time, it may be desirable to use a relatively narrow spreading bandwidth (e.g., 1 MHz) to aid in acquisition of the signal by receivers 20.

In cases in which the orbit is known in advance with a degree of certainty, a wider spreading bandwidth (e.g., 20 MHz) will provide greater measurement accuracy and greater processing gain. In the case in which there are multiple systems operating in the same geographical area, concerns about mutual interference may require that different codes be chosen for the different transmitters in the systems.

The time of generation of the first bit in the code sequence is governed by the GPS time. A signal at a frequency appropriate for the satellite being tracked is generated by exciter 130. Typically, the signal would be transmitted near the center of one of the communication transponders on the satellite to be tracked. Modulator 140 is used to combine the pseudorandom code from code generator 120 with the signal from exciter 130, for example, by bi-phase modulating the exciter signal with the code bits.

The resulting spread spectrum signal is amplified to an appropriate level by amplifier 150 and sent to an uplink antenna 190 where it is radiated. Due to the great processing gain possible in the system resulting from the potentially wide spreading bandwidth, the signal can be transmitted to the satellite at such a low broadband power density that its presence will not be detectable by ordinary receivers.

Antenna 190 is controlled by antenna controller 180 to aim in the direction of the satellite to be tracked. The aiming commands are sent from controller/analyzer 50 (FIG. 1) via network 40, modem 170, and controller 160.

Figure 3:
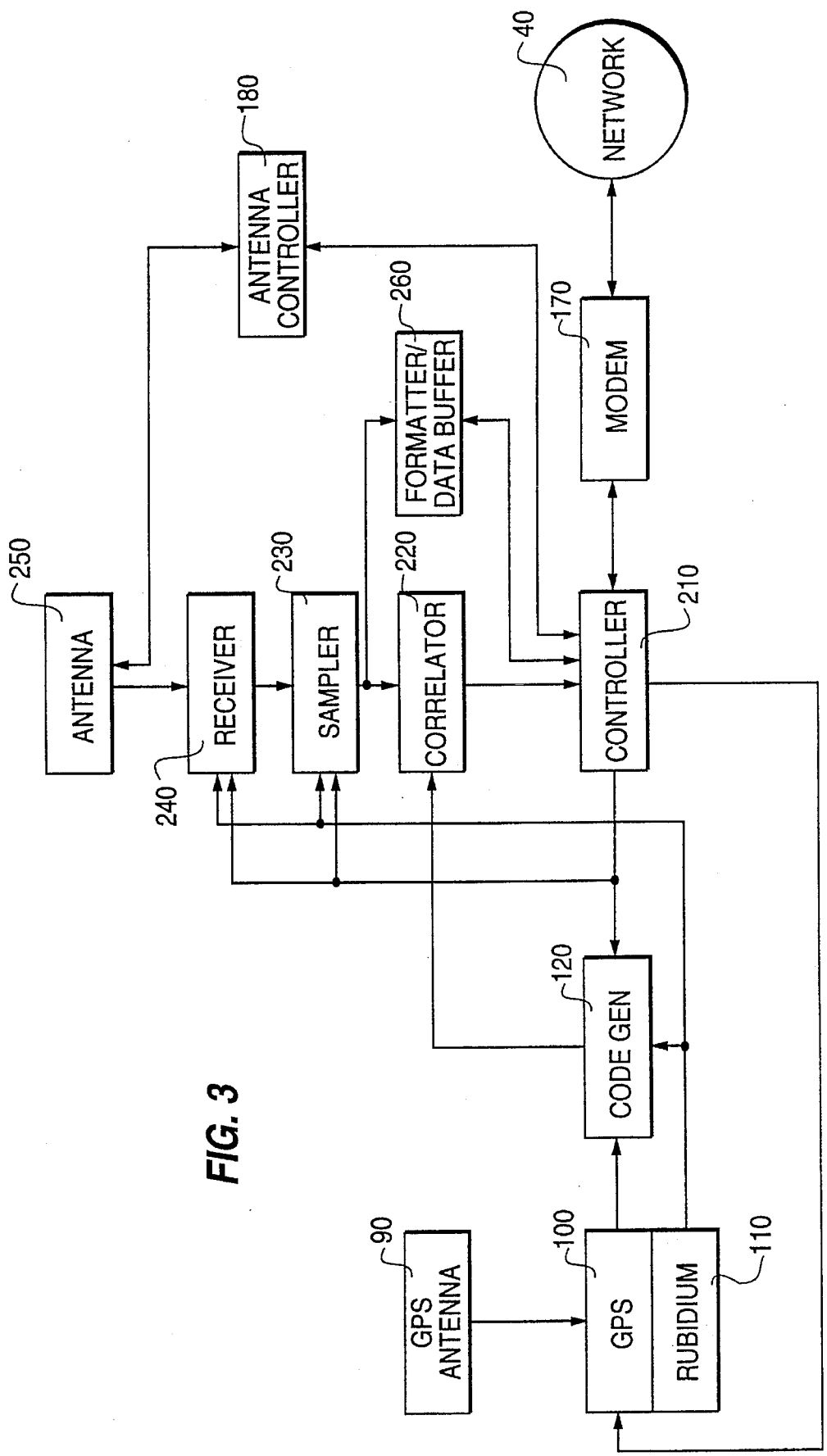
FIG. 3 is a block diagram illustrating a receiver used in the system shown in FIG. 1, in accordance with a preferred embodiment of the invention.

FIG. 3 shows a block diagram of a receiver 20, in accordance with a preferred embodiment of the invention. As shown in FIG. 3, the signal on the downlink from the satellite to be tracked arrives at antenna 250, which has received commands via network 40, modem 170, and controller 210 to point in the direction of the satellite. The satellite signals are downconverted to baseband in receiver 240 under control of controller 210. The baseband signal is sampled by sampler 230 and the sampled signal is cross-correlated in correlator 220 with a signal generated by code generator 200.

The signal from code generator 200 is identical to the signal from code generator 120 (FIG. 2) except that it is offset in time and frequency to compensate for the expected round trip time delay and frequency offset between code generator 120 and the output of sampler 230. Also, code generator 200 is preferably synchronized with Universal Time. Correlator 220 neutralizes the spreading introduced by modulator 140 (FIG. 2), concentrating all the power of the spread spectrum signal into a very narrow bandwidth, thereby achieving the processing gain.

The output of correlator 220 is analyzed by software in controller 210 to determine the total roundtrip time delay and frequency offset. As in the transmitter in FIG. 2, the operation of the receiver is controlled by a GPS time and frequency system, which includes a GPS antenna 90, a GPS receiver 100, and a stable oscillator or frequency standard 110. A path is shown from controller 210 to GPS receiver 100 over which the differential corrections will be transmitted.

In passive mode operation, the samples obtained from sampler 230 are directed to a buffer memory 260. Controller 210, which carries out instructions sent from controller/ analyzer 50 across network 40, instructs receivers 20 in the system to transmit a specified group of data samples back to controller/analyzer 50 where a cross-correlation algorithm is used to determine the differences in time and frequency of arrival among receivers 20.

While in passive mode operation, the data samples themselves are returned to controller/analyzer 50, where the cross-correlation operation is performed preferably by software. The resulting time of arrival differences are processed preferably by a Kalman filter algorithm to determine, for example, for each satellite, the six orbital elements, and, for all receivers except one, the GPS clock offset relative to the reference station.

When the times of arrival have been determined in active mode operation, they are sent from receivers 20 to controller/analyzer 50, where they are analyzed by any one of several possible standard orbit determination algorithms. Preferably, a Kalman filter type algorithm will be employed to update immediately the estimates of relevant values, such as, for each satellite, six orbital elements, transponder time delay, and transponder frequency shift, and, for each receiver, the GPS time error.

Figure 4:
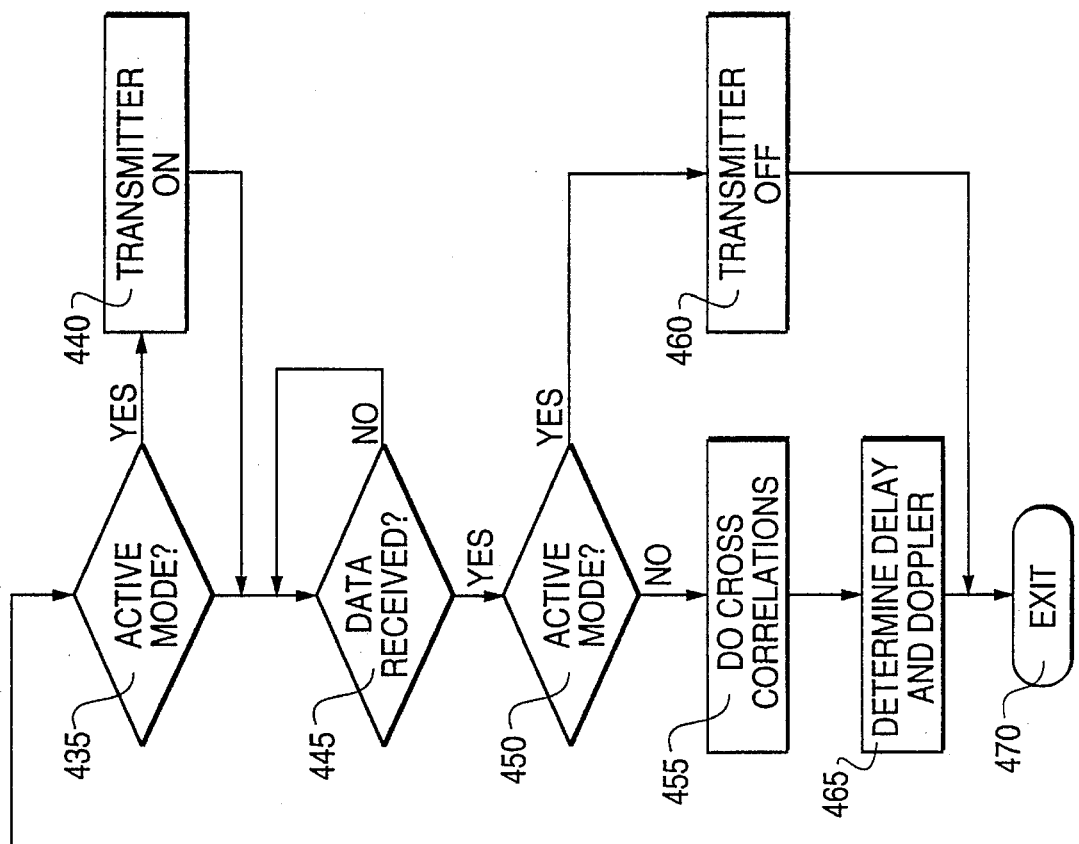
FIG. 4 is a flow diagram illustrating the steps of a control method in accordance with a preferred embodiment of the invention.
Figure 4:
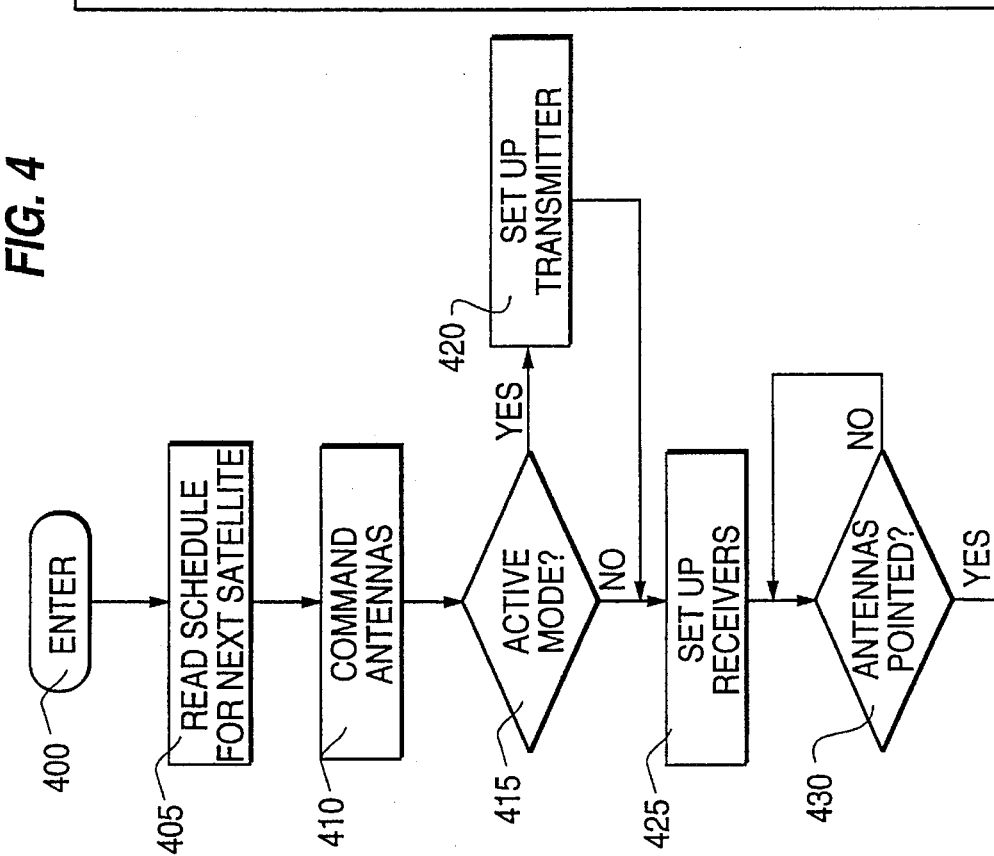

The steps carried out by controller/analyzer 50 in observing the signals from the satellite to be tracked is illustrated in a flow diagram in FIG. 4. Initially (step 400), controller/analyzer 50 determines which satellite to observe next (step 405). The antennas in the network are commanded to point to the desired satellite (step 410). Then, if the observation is carried out in the active mode (step 415), the transmitter is commanded to the desired frequency, code rate, and power level (step 420). If the observation is carried out in the passive mode, step 420 is not performed.

When the system is in either mode, the receivers are set up to the appropriate frequency, code rate, time delay, frequency offset, and observing mode (step 425). The system waits for the antenna-pointing operation to complete (step 430). If the observation is in the active mode (step 435), the transmitter is turned on (step 440). Otherwise, controller/analyzer 50 skips step 440. When the receivers have received data (step 445), controller/analyzer 50 turns off the transmitter (step 460) if the observation is performed in the active mode (step 450) and completes the process (step 470).

If the observation is made in the passive mode (step 450), the data received are cross-correlated (step 455) and the differential delays and frequency shifts are determined (step 465) before the process is completed (step 470).

Figure 5:
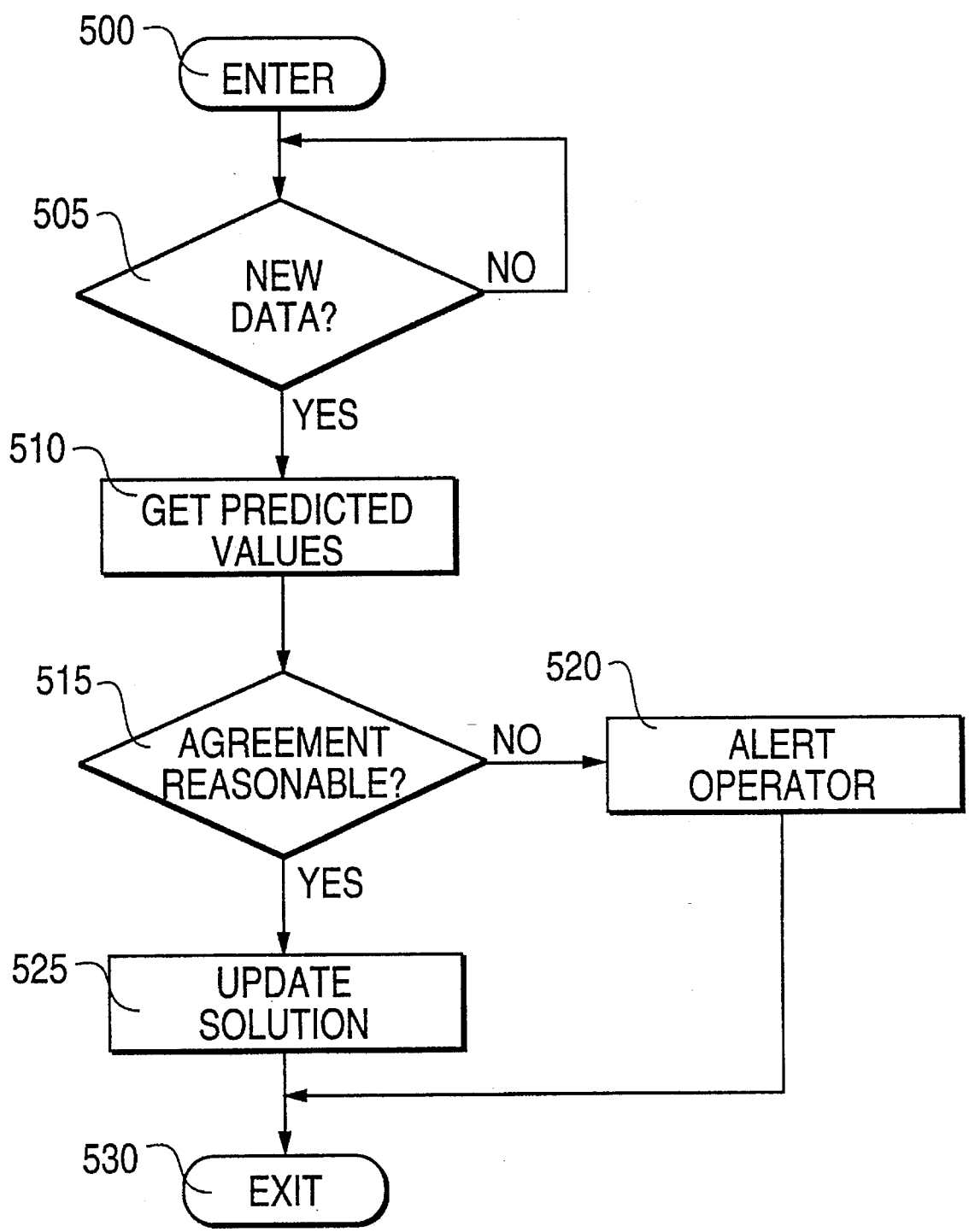
FIG. 5 is a flow diagram showing the steps of an analysis method in accordance with a preferred embodiment of the invention.

After receiving the data, controller/analyzer 50 processes it in accordance with the steps illustrated in the flow diagram of FIG. 5. After the system is initialized (step 500), controller/ analyzer 50 waits for the arrival of new data (step 505). When new data have arrived, controller/analyzer 50 uses the most recent orbital information to predict the values of the newly received data (step 510). The data values are compared with predicted values to determine if they are reasonable (step 515). This comparison is based on the current estimate of the orbital prediction accuracy and the expected statistics of an individual measurement. If not, the operator is alerted to take corrective action (step 520) and the analysis is completed (step 530). Otherwise, the Kalman filter algorithm is applied (step 525) to obtain improved estimates, and controller/analyzer 50 completes the analysis (step 530).

It will be apparent to those skilled in the art that various modifications and variations can be made in the method and system of the present invention without departing from the scope or spirit of the invention. Thus, it is intended that the present invention cover the modifications and variations of this invention provided they come within the scope of the appended claims and their equivalents.

What is claimed:

1. In a satellite tracking system, a method of tracking a satellite comprising the steps of:

transmitting a tracking signal from a transmitter having a known location to the satellite;

receiving and retransmitting the tracking signal at the satellite;

receiving the retransmitted tracking signal at at least one receiver having a known location;

determining time delay and Doppler shift of the tracking signal received at the at least one receiver; and determining at least one of a position and velocity of the satellite based upon the determined time delay and Doppler shift.

2. The method according to claim 1, further comprising the steps of:

synchronizing a first pseudorandom code generator to Universal Time;

modulating the transmitter in accordance with the first pseudorandom code generator before the step of transmitting the tracking signal, wherein the step of determining time delay and Doppler shift includes:

synchronizing a second pseudorandom code generator to Universal Time;

cross-correlating the signal received at the at least one receiver with a pseudorandom code from the second pseudorandom code generator; and analyzing the cross-correlated signal to determine the time delay and Doppler shift of the cross-correlated signals.

3. The method according to claim 1, further comprising the step of:

determining a position of an unknown transmitter in accordance with the determined position of the satellite.

4. The method according to claim 3, wherein the step of determining a position of an unknown transmitter comprises the steps of:

receiving at the tracked satellite an interfering signal from an unknown transmitter;

receiving at an adjacent satellite the interfering signal;

retransmitting the received signals from the tracked satellite and adjacent satellite;

receiving at a plurality of receivers the retransmitted signals; and determining the position of the unknown transmitter from the received retransmitted signals.

5. In a satellite tracking system, a method of tracking a satellite comprising the steps of:

receiving at a plurality of receivers having known locations a signal from the satellite;

transmitting the received signals to a central location;

determining a difference in time delay and Doppler shift of the received signals at the central location; and determining at least one of a position and velocity of the satellite based upon the determined difference in time delay and Doppler shift.

6. The method according to claim 5, further comprising the steps of:

synchronizing each receiver to Universal Time; and determining the time that each receiver received the signal.

7. The method according to claim 6, wherein the step of determining a difference in time delay and Doppler shift comprises the steps of:

cross-correlating the signals received at the plurality of receivers; and analyzing the cross-correlated signals to determine the difference in time delay and Doppler shift.

8. The method according to claim 5, further comprising the step of:

determining a position of an unknown transmitter in accordance with the determined position of the satellite.

9. The method according to claim 8, wherein the step of determining a position of an unknown transmitter comprises the steps of:

receiving at the tracked satellite an interfering signal from an unknown transmitter;

receiving at an adjacent satellite the interfering signal;

retransmitting the received signals from the tracked satellite and adjacent satellite;

receiving at a plurality of receivers the retransmitted signals; and determining the position of the unknown transmitter from the received retransmitted signals.

10. A satellite tracking system for tracking a satellite comprising:

means for transmitting a tracking signal to the satellite, the transmitting means having a known location;

means for receiving the tracking signal retransmitted from the satellite, the first receiving means having a known location;

means for controlling the transmitting means and receiving means; and means for determining at least one of a position and velocity of the satellite based upon the received retransmitted tracking signal.

11. The system according to claim 10, wherein the transmitting means is synchronized to Universal Time.

12. The system according to claim 11, wherein the determining means includes means for cross-correlating the received retransmitted tracking signal with a pseudorandom code synchronized to Universal Time.

13. The system according to claim 10, further comprising means for providing the determined satellite position to a system for locating an unknown transmitter.

14. A satellite tracking system for tracking a satellite comprising:

first means for receiving a signal transmitted from the satellite, the first receiving means having a known location;

second means for receiving the signal transmitted from the satellite, the second receiving means having a known location;

means for controlling the first receiving means and second receiving means; and means for determining at least one of a position and velocity of the satellite based upon the received signals.

15. The system according to claim 14, wherein the first and second receiving means are synchronized to Universal Time.

16. The system according to claim 15, wherein the determining means includes means for cross-correlating the signals received at the first and second receiving means.

17. The system according to claim 14, further comprising means for providing the determined satellite position to a system for locating an unknown transmitter.

18. A satellite tracking system operable in two modes for tracking a satellite comprising:

means for transmitting a tracking signal to the satellite, the transmitting means having a known location;

first means for receiving a signal, including the tracking signal retransmitted from the satellite, the first receiving means having a known location;

second means for receiving a signal, including the tracking signal retransmitted from the satellite, the second receiving means having a known location;

means for controlling the transmitting means, first receiving means, and second receiving means; and means for determining at least one of a position and velocity of the satellite based upon at least one of the received retransmitted tracking signals.

19. The system according to claim 18, further comprising means for providing the determined satellite position to a system for locating an unknown transmitter.

20. The satellite tracking system according to claim 18, wherein the transmitting means, the first receiving means, and the second receiving means are synchronized in accordance with Universal Time.

21. The satellite tracking system according to claim 18, wherein the determining means comprises:

means for cross-correlating the signal received at the first receiving means with the signal received at the second receiving means.

22. The satellite tracking system according to claim 18, wherein the determining means comprises:

means for cross-correlating the signal received at the first receiving means with a pseudorandom code synchronized with Universal Time, wherein the transmitting means is synchronized with Universal Time.

* * * * *

UNITED STATES PATENT AND TRADEMARK OFFICE
CERTIFICATE OF CORRECTION

PATENT NO. : 5,570,096

DATED : October 29, 1996

INVENTOR(S) : Curtis A. Knight and John C. Webber

It is certified that error appears in the above-identified patent and that said Letters Patent is hereby corrected as shown below:

On the title page,
item [54], & col. 1, in the Title, line 3, change "TRANSMITTING" to --TRANSMITTERS--.

Signed and Sealed this

Seventh Day of January, 1997

Attest:

BRUCE LEHMAN

*Attesting Officer*   *Commissioner of Patents and Trademarks*